United States Patent [19]
Herter

[11] 3,805,502
[45] Apr. 23, 1974

[54] SAFE ROTARY MOWER BLADE

[76] Inventor: George L. Herter, 929 3rd Ave., Waseca, Minn. 56093

[22] Filed: June 12, 1972

[21] Appl. No.: 262,036

Related U.S. Application Data
[63] Continuation-in-part of Ser. No. 248,607, April 28, 1972, abandoned.

[52] U.S. Cl. ................................................. 56/295
[51] Int. Cl. .......................................... A01d 55/18
[58] Field of Search .................... 56/295, 255, 17.5

[56] References Cited
UNITED STATES PATENTS
3,096,608  7/1963  Williamson ........................... 56/295
3,420,043  1/1969  Hershey ................................ 56/295
3,080,697  3/1963  Mauro .................................. 56/295
3,097,469  7/1963  Belfiore ................................ 56/295
3,338,039  8/1967  Nightingale et al. .................. 56/295

Primary Examiner—Russell R. Kinsey
Attorney, Agent, or Firm—George F. Williamson

[57] ABSTRACT

A bar-shaped rotary mower blade with one or more rigid circular peripheral rings of the blade rotation axis and suspended beneath the blade adjacent the outer ends thereof, and a supplemental blade with an oblique sharpened edge between the peripheral ring and the main diametrically oriented blade.

4 Claims, 4 Drawing Figures

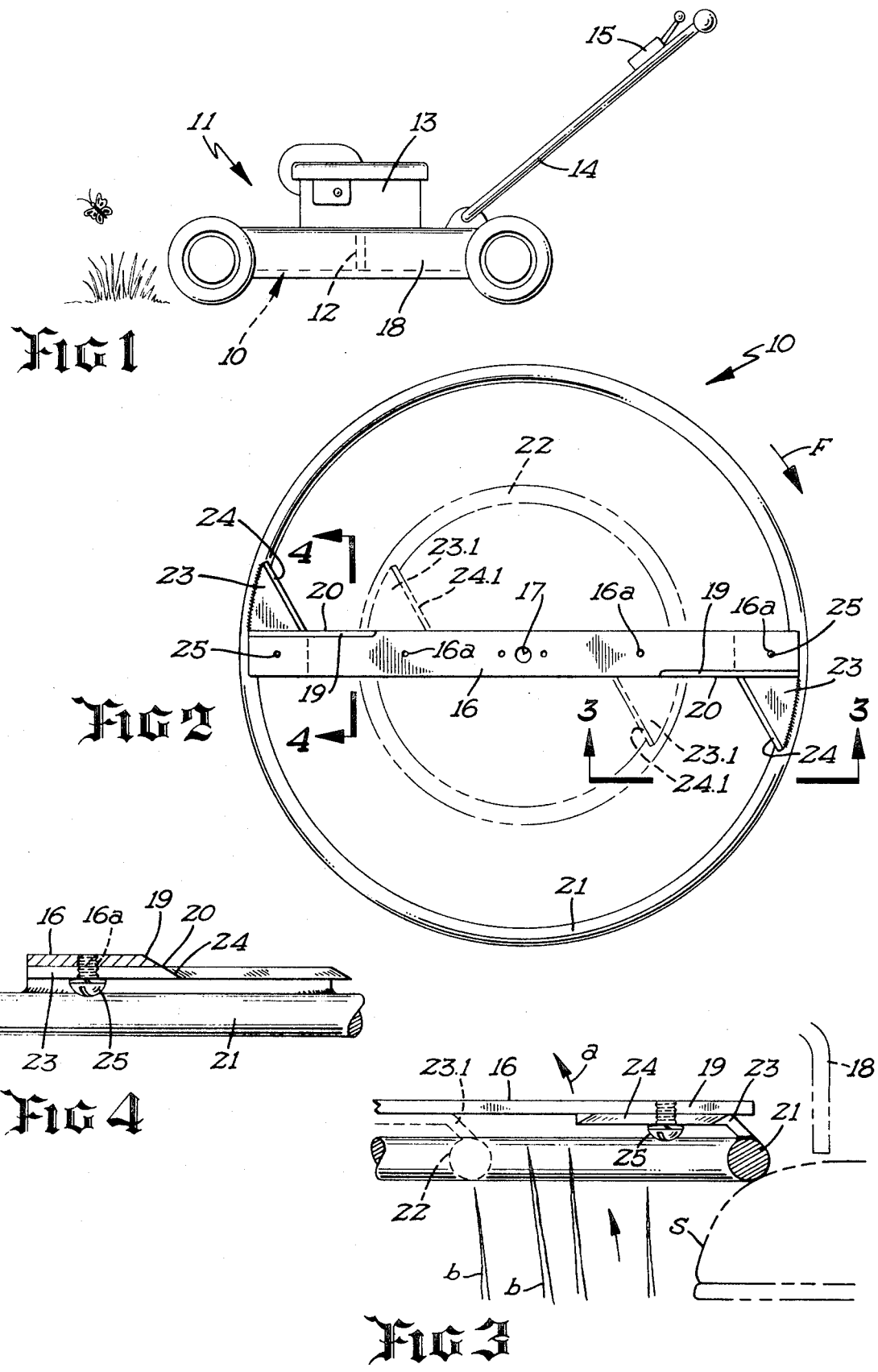

SAFE ROTARY MOWER BLADE

This application is a continuation-in-part of my co-pending U.S. Pat. application Ser. No. 248,607, entitled "Safe Rotary Mower Blade," filed on Apr. 28, 1972, and now abandoned.

BRIEF SUMMARY OF THE INVENTION

A principal aspect of the present invention is the attachment to a substantially conventional bar-shaped rotary lawn mower blade, of a rigid circular ring concentric of the blade axis and attached to the blade adjacent the outer ends of the blade in suspended relation adjacent the sharpened edge at the outer end of the blade. Separate concentric rings may be supplied at both the inner and outer ends of the sharpened portion of the blade. The overall structure is open to allow air movement and movement of grass clippings upwardly through the blade and ring areas as the assembly is revolved at high speed within the housing of a rotary lawn mower. The peripheral ring is especially valuable in minimizing any possibility of allowing a person's shoe or foot to engage the high speed rotary bar-shaped blade so as to avoid any injury or damage to the foot or shoe.

Another principal aspect of the present invention is the provision of a supplemental blade adjacent each end of the bar-shaped blade and attached to the concentric ring.

The supplemental blade has a sharpened edge obliquely oriented with respect to the diametrically oriented mower blade and extending to the ring. This supplemental blade prevents the possibility of grass collecting in the corner formed by the concentric ring and the diametrically oriented mower blade, and this supplemental blade also serves as a mounting bracket for attaching the ring to the mower blade.

Because the ring is suspended well below the plane of the rotary bar-shaped blade, the concentric ring will deflect stones and other objects beneath the mower housing and will prevent such objects from receiving the full force of the impact of the rotary blade because the rotary rings deflect such objects downwardly adjacent the outer end of the blade and therefore such objects are not given the extreme impetus by the rotating blade and are not flung violently out of the discharge opening of the rotary lawn mower in the fashion that has been heretofore well known. The impelling and throwing of such objects is materially suppressed by these rings concentric of the blade axis and disposed in suspended relation beneath the blade and adjacent the inner and outer ends of the sharpened portions of the blade.

There is no known significant prior art. It is pointed out, however, that, in a preliminary patentability search, the following art was noted: U. S. Pat. Nos. 2,859,581; 3,336,737; 3,338,039; and 3,420,043. With respect to this prior art, it is particularly noted that there is significant structural distinction in the present invention with respect to all of this prior art. The disc arrangements in this prior art prevents the production of an adequate amount of upward suction or air movement to cause the grass to stand up for cutting with a rotary mower blade; and further, the shaped rims of these discs are of such configuration as to minimize any shoe or foot deflecting capabilities thereof and do not obstruct the rapid movement of stones or other objects tending to be flung or moved by the blade.

BRIEF DESCRIPTION OF DRAWINGS

FIG. 1 is a side elevation view of a rotary lawn mower of the type with which the present invention is utilized.

FIG. 2 is a top plan view of the present invention shown detached from the mower, and showing in dotted lines an additional safety ring which may be used in a modified form.

FIG. 3 is an enlarged detail section view taken approximately at 3—3 in FIG. 2 and showing, in dotted lines, the relative positions of the mower housing, the tip of the shoe inserted beneath the mower housing, and upstanding grass and air currents which are typically present during the operation of the mower with the present blade attached.

FIG. 4 is an enlarged detail section view taken approximately at 4—4 in FIG. 2.

DETAILED DESCRIPTION OF THE INVENTION

One form of the invention is shown in the drawings and is described herein. The safe rotary lawn mower blade 10 is shown in dotted lines in FIG. 1 attached to the lawn mower 11 and mounted on the spindle 12 of the engine 13 which is gasoline driven in most instances, but may be replaced by an electric motor in certain types of lawn mowers. The handle 14 carries a throttle mechanism 15 for controlling the speed of the engine 13.

The safe blade 10 includes a bar-shaped blade 16 of generally conventional design. The blade 16 has a central mounting hole 17 for receiving the spindle 12 of the engine to which the blade is attached by means of a suitable nut or other locking device. The blade 16 is approximately as long as conventional blades and swings into close proximity with the depending peripheral skirt of the mower housing 18. Adjacent each of the outer ends of blade 16, the blade has a sharpened leading edge portion 19 which produces a fan effect for the blade 16 to cause the blade to move air upwardly as the blade is revolved within the housing 18, and in the manner of the arrows a illustrated in FIGS. 3 and 4. This movement of air uplifts the blades of grass b for cutting. The leading edge portions 19 have sharpened edges 20 so as to sever the uplifted grass blades b in a conventional manner.

The blade 10 is also provided with a rigid ring 21 which has a circular configuration and which is formed of steel or hard plastic material which is circular in cross section. Of course, the cross-sectional shape may be changed to square or generally elliptical as desired, but it has been found that material of round cross section is suitable.

The blade 10 may also be provided with a second rigid ring 22, almost identical to the ring 21, but of a smaller diameter.

The rigid rings 21 and 22 lie in the same plane and concentric of each other and of the spindle mounting hole 17. It will be seen in the drawings that the rigid rings 21 and 22 lie beneath the bar-shaped blade 16 and wholly beneath the level of the edges 20 of the obliquely downwardly bent leading edge portions 19 of the blade 16.

The outer rigid ring 21 is disposed in close proximity with the outer ends of the blade 16 and adjacent the outer ends of the downturned leading edge portions 19 and the sharpened edges 20 so as to effectively shroud this outer terminal portion of the blade 16.

The inner ring 22 may be disposed approximately at the radially inward ends of the sharpened edges 20 of the leading edge portions 19 so as to effectively shroud this area of the blade 16 and cooperate with the rigid ring 21 in effectively shrouding the whole of the sharpened edge portions from beneath the blade 16.

The rigid ring 21 has a pair of mounting brackets 23 welded thereto and lying flat against the bottom side of the blade 16 while suspending the ring 21 in spaced relation beneath the blade 16 in the manner illustrated and described. These brackets or clips 23 are affixed to the blade 16 by cap screws 25 held in threaded holes 16a of the blade.

Each of the brackets 23 has a sharpened leading edge 24 and oriented obliquely of the sharpened edge 20 of blade 16. The bracket or supplemental blade 23 underlies the end of blade 16 and also protrudes forwardly therefrom with respect to the direction of rotation as indicated by arrow F, and along the rigid ring 21. The sharpened edge 24 cooperates with the sharpened edge 20 of blade 16 in severing the grass uplifted by the fan action of the blade and the edge 24 prevents grass from collecting in the corner between the blade 16 and ring 21.

Additional tapped apertures 16a are provided in the blade 16 midway between the spindle mounting hole 17 and the outer end of the blade 16 to provide for mounting the additional concentric ring 22 which is connectible to the blade 16 by a bracket or supplemental blade 23.1 which also has a sharpened edge 24.1. In many instances, the use of the additional ring 22 will not be necessary, but the use of ring 22 does contribute to the safety in using the rotary mower 11.

In operation, the blade 10 is attached to the engine spindle 12 of the lawn mower and the blade is disposed almost entirely within the housing 18 and particularly so that the blade 16 is disposed above the level of lower edge of the depending skirt of the housing 18. When the engine 13 is started, the blade 16 will be revolved at a rapid rate and will produce an upward suction or movement of air so as to uplift the grass b to be cut by the sharpened edge 20. Of course, the rigid ring 21 (and ring 22, if used) revolves with the blade 16, but there is essentially no obstruction to the upward movement of air as to produce the desired suction and uplifting of the blades of grass.

Although the ring 21 is revolving rapidly, it carries no obstructions so as to damage or injure anything which comes into contact with it from beneath. If a person's shoes should accidentally be extended beneath the edge of the mower housing 18, in the manner illustrated in FIG. 3 where the shoe is indicated in general by the letter S, the tip of the shoe will be engaged by the ring 21 so as to keep the shoe downwardly away from the sharp edge 20, or to uplift the ring 21, blade 16 and mower housing 18 due to the reaction against the shoe S.

If the person's shoe should be extended further under the mower housing 18 than as illustrated in FIG. 3, it is quite unlikely that the shoe S would engage the sharpened edge portion 20 because the shoe is kept well downwardly and away from the sharpened edge by the rigid ring 21.

When the mower 11 passes over stones or other objects on the lawn being cut, there is little tendency for the stones or other objects to be picked up and thrown out the trash port of the housing 18. Such stones as are encountered and moved will tend to move outwardly toward the outer periphery of the safe blade 10, and the stones or other objects will encounter the rigid ring 21. Because the ring 21 is spaced well below the planar portion of the blade 16 as illustrated in FIGS. 3 and 4, the stone will be obstructed by the inner side of the ring 21 and will be essentially stopped. It should be understood that it is the outermost portion of the blade 16, in the vicinity of the leading edge portions 19 that produce the extreme velocity of the object or stones which are picked up off the grass and flung out the trash port of the housing. The ring 21 and supplemental blade 23 will prevent the stone from moving upwardly into engagement with the leading edge portions 19 or cutting edges 20, but, in any event, even if such stones do engage the leading edge portions 19 of the blade, the ring 21 will restrain the outward propulsion of such stones or other objects so as to minimize any likelihood of the high velocity flinging of such stones or objects out of the trash port of the housing 18.

It will therefore be seen that because the ring 21 is disposed well below the plane of the blade 16 and below the sharpened edges 20 and 24, blade 16 and supplemental blade 23, this ring 21 serves to both deflect and stop outward propulsion of stones and other objects which are picked up off the lawn and also prevent engagement by the shoe or foot of a person projected under the edge of housing 18 from engaging the sharpened edges of the whirling blade. The ring 21 repels the shoe or foot projected under the housing or on the contrary will cause the mower to be lifted up in the reaction against the shoe.

If the additional inner concentric rigid ring 22 is used on the blade 16 with the ring 21, the ring 22 has several important functions. Firstly, it cooperates with ring 21 in preventing objects, such as a person's foot, from engaging the whirling blade 16 from a position beneath the blade. The ring 22 also restrains the outward propulsion of stones which may be picked up and propelled by the blade 16 at locations near the central hole 17. In addition, the ring 22 helps prevent scalping of the lawn or gauging of the blade into the turf at locations where the turf may have uneven contours, such as at the crest of a hill.

The supplemental blade 23, serving as the bracket to connect the ring 21 to the blade 16 functions to sever the grass that may otherwise collect in the corner between the blade 16 and ring 21. In addition, the supplemental blade 23, and its edge 24 which is oriented obliquely with respect to blade 16, will deflect stones and other objects which would otherwise be propelled under high velocity out of the trash port of the housing, and, as a result, the flinging of objects from the mower is minimized.

Although a particular shape of blade is illustrated in the drawings, it is intended that the blade 16 is only representative of numerous shapes of blades formed of hardened flat steel and employed in various rotary lawn mowers sold in the market today. The steel blade 16 may have various shapes or other features for functional reasons. The safety rings 21 and 22 may be readily and easily attached to almost any blade that is used in a rotary lawn mower. Of course, the rings or circles can be bolted or clipped to the blades, or may be welded to the blades, according to the conditions under which the rings are manufactured and applied to the blades.

What is claimed is:

1. A safe rotary mower blade comprising:

a bar-shaped rotary mower blade having a spindle-receiving mounting hole and having sharpened edge portions adjacent the opposite ends thereof, said sharpened edge portions facing forwardly of the direction of rotation of the rotary mower blade;

a rigid circular ring concentric of the spindle hole and being located beneath the blade adjacent the outer ends thereof and adjacent said sharpened portions;

a pair of supplemental blades on the circular ring and respectively disposed adjacent opposite ends of the mower blade, said supplemental blades having forwardly facing sharpened edges oriented obliquely with respect to the mower blade; and means fixedly attaching the ring to said mower blade in spaced relation below the mower blade.

2. The mower blade according to claim 1 and including a second rigid ring disposed concentrically within said first-mentioned rigid ring and affixed to the blade in spaced relation therebelow, said second rigid ring being disposed adjacent the inner end of the sharpened portion of the bar-shaped blade.

3. The invention according to claim 1 and said supplemental blade also having a portion bearing against said mower blade and providing a bracket connection between the mower blade and the rigid ring.

4. A safe blade for a rotary lawn mower, comprising:

an elongate bar-shaped mower blade having a central spindle-receiving mounting hole and also having opposite end portions for rotary movement about said spindle hole, said blade also having leading edge portions relative to the direction of rotation, said leading edge portions being obliquely formed to produce a fan effect as the blade is revolved to induce upward movement of air to draw the blades of grass upwardly for cutting;

a rigid and circular ring concentric of said mounting hole and being disposed adjacent the outer ends of the blade, said ring being disposed at a level beneath the sharpened edge of said leading edge portions to prevent engagement of the blade by a person's foot or shoe under the edge of the lawn mower housing and also to obstruct outward impelling of stones and other objects due to whirling of the blade; and means attaching and suspending said rings in spaced rotation below the blade, said means including a pair of rigid bracket plates, each affixed to the circular ring adjacent a respective end of the mower blade, each of said bracket plates extending forwardly of the adjacent leading edge portion of the mower blade, and having a sharpened forwardly facing edge portion extending obliquely forwardly and outwardly toward the ring from the sharpened leading edge of the mower blade, and removable fasteners detachably attaching said bracket plates of the ring to the mower blade.

* * * * *